United States Patent
Young

(10) Patent No.: US 8,250,757 B2
(45) Date of Patent: Aug. 28, 2012

(54) LASER SURFACE TREATMENT FOR MECHANICAL SEAL FACES

(75) Inventor: Lionel Young, Murrieta, CA (US)

(73) Assignee: Flowserve Management Company, Irving, TX (US)

( * ) Notice: Subject to any disclaimer, the term of this patent is extended or adjusted under 35 U.S.C. 154(b) by 356 days.

(21) Appl. No.: 12/586,379

(22) Filed: Sep. 21, 2009

(65) Prior Publication Data

US 2010/0038862 A1    Feb. 18, 2010

Related U.S. Application Data

(63) Continuation-in-part of application No. PCT/US2008/003741, filed on Mar. 21, 2008.

(60) Provisional application No. 60/919,304, filed on Mar. 21, 2007.

(51) Int. Cl.
*B21D 53/84* (2006.01)

(52) U.S. Cl. .......................... 29/888.3; 29/557

(58) Field of Classification Search ................. 29/888.3, 29/557; 277/306, 357–360, 400, 401, 403, 277/404, 405, 408, 943
See application file for complete search history.

(56) References Cited

U.S. PATENT DOCUMENTS

| | | | |
|---|---|---|---|
| 3,601,413 A | 8/1971 | Darnell | |
| 3,633,926 A | 1/1972 | Hryniszak et al. | |
| 4,391,450 A | 7/1983 | Beck | |
| 5,529,317 A | 6/1996 | Muller | |
| 5,579,364 A * | 11/1996 | Osaka et al. | 378/130 |
| 5,681,395 A | 10/1997 | Werner | |
| 6,446,976 B1 | 9/2002 | Key et al. | |
| 6,528,168 B1 | 3/2003 | Matsumoto et al. | |
| 6,872,649 B2 | 3/2005 | Nakamura et al. | |
| 7,194,803 B2 * | 3/2007 | Young et al. | 29/888.3 |
| 7,287,756 B2 * | 10/2007 | Byers et al. | 277/405 |
| 2003/0209859 A1 | 11/2003 | Young et al. | |
| 2006/0079040 A1 | 4/2006 | Tanaka et al. | |
| 2007/0045966 A1 * | 3/2007 | Jiang et al. | 277/404 |
| 2009/0045586 A1 * | 2/2009 | Cantow | 277/406 |

OTHER PUBLICATIONS

International Search Report and Written Opinion dated Jul. 7, 2008 for PCT/US2008/003741.
International Preliminary Report on Patentability dated Oct. 1, 2009 for PCT/US2008/003741.

\* cited by examiner

*Primary Examiner* — Sarang Afzali
(74) *Attorney, Agent, or Firm* — Miller Canfield Paddock and Stone PLC; Mark L. Maki

(57) ABSTRACT

A seal ring arrangement generally includes a pair of opposed seal rings which define a shaft seal to prevent leakage along the shaft of rotary equipment. A seal face treatment process has been developed using seal ring machining equipment which has a laser unit that forms micro-topography depth features in the seal face and then performs a material surface treatment process to selectively alter the conductivity of the seal face so as to virtually eliminate electro-corrosion in the seal rings. The seal rings preferably are provided in a conventional combination of a carbide seal ring material for one of the seal rings and a silicon carbide material for the other seal ring. The laser machining and the laser treatment processes are preferably applied to the silicon carbide material.

11 Claims, 7 Drawing Sheets

LASER SURFACE TREATMENT FOR MECHANICAL SEAL FACES

CROSS REFERENCE TO RELATED APPLICATION

This application is a continuation-in-part of PCT Application No. PCT/US2008/003741, filed Mar. 21, 2008, which claims the benefit of U.S. Provisional Application Ser. No. 60/919,304, filed Mar. 21, 2007, which is incorporated herein by reference in its entirety.

FIELD OF THE INVENTION

The invention relates to a seal ring for rotating shafts and more particularly, relates to a seal ring having a seal face wherein the surface properties of the seal face are modified by a laser process applied to the seal face to minimize electro-corrosion in the seal face, and further relates to the laser surface treatment process for forming such a seal ring.

BACKGROUND OF THE INVENTION

To seal rotating shafts of pumps, compressors and the like, it is known to provide a non-contacting shaft seal on the shaft, which includes an axially adjacent pair of seal rings wherein one seal ring rotates with the shaft and the other seal ring is non-rotatably connected to a seal housing. The seal rings each include an end face which faces axially wherein the seal faces are disposed in close opposing relation to define a sealing region extending radially between the outer and inner diameters of the seal rings. The fluid being sealed in conventional seals can either be a liquid or a gas, and the sealing region prevents or minimizes migration or leakage of the fluid radially across the seal faces.

More particularly, the seal faces typically are disposed in contact with each other when the shaft is not rotating to thereby define a static seal. Further, at least one of the seal faces includes a hydrodynamic face pattern that generates a fluid film between the seal faces during shaft rotation to reduce if not eliminate contact between the seal faces.

Hydrodynamic face patterns are known and include wavy faces, spiral grooves, T-grooves and the like. The face patterns are formed in the seal faces through various processes and typically involve providing a flat face and then removing material from the seal face to a very small depth. Typically the seal rings comprise a carbon seal ring and a silicon carbide seal ring which is a well known material combination.

While such mechanical seals are readily useable in a wide variety of environments, in specific sealing applications, for example, for the power industry and primarily for boiler feed seals in water, a particular electro-corrosion phenomenon occurs that results in damage to the seal faces. This damage manifests itself in different forms, and for example, may manifest itself as pitting on the outer diameter of the silicon carbide (SiC) seal face. The corrosive phenomenon also may manifest itself on the carbon seal interface.

It is believed that this electro-corrosion is the result of a form of static electrical charge that develops, possibly by friction between the relatively rotating running seal faces, which charge develops on one or both of the seal faces and then discharges to the mating face or another nearby metal component of the seal assembly or else to the surrounding water. This discharge is believed to result in damage to the seal rings and premature wear thereof.

With respect to the sealing applications in which such phenomenon occurs, one such environment is the aforementioned boiler feed seals wherein such boiler feed seals may use ultra pure water having a low conductivity wherein such water also may include an oxygen treatment therewith. This type of low conductivity water or other similar fluid being sealed is believed to facilitate the occurrence of the electro-corrosion phenomenon.

To date attempts have been made to solve this problem in different ways. For example, one such attempt to resolve this problem has been the use of similar materials for the seal faces, specifically, silicon carbide against silicon carbide. Normally, conventional seals as mentioned above comprise carbon and silicon carbide seal rings wherein one theory is that the use of the different seal face materials is one factor in the occurrence of the electro-corrosion thereof. However, the use of silicon carbide against silicon carbide results in a seal ring combination that is undesirable in that such seal rings are sensitive to damage when contact of the seal faces occurs which can happen during starts and stops of the shaft as well as operational upsets that might occur during normal operation of a pump which upsets may force the seal faces together and result in damage to the seal faces. Further, it has been found that even silicon carbide versus silicon carbide can result in problems if these seal faces have a high ratio of electrical conductivity wherein surface damage can still occur.

Also, U.S. Pat. No. 4,391,450 addresses the problem of electro-kinetic corrosion occurring in the mating surfaces of the seal rings of a mechanical seal used in sea water wherein the mechanical seal is used in the presence of an electrolytic liquid, i.e. sea water. The '450 patent proposes a solution for such electro-kinetic corrosion which solution is allegedly achieved by selecting the materials for both of the seal rings wherein both seal rings are selected so to both be electrically insulative or non-conductive so as to not support an electro-chemical reaction either at all or after a brief initial stage.

It also has been known to employ grounding devices on a rotatable shaft to attempt to draw away stray currents that develop. This has had some success but not in every case. This does result in additional expense, and may be limited by availability of space, and the improper application of such a device can possibly generate more charge and damage to other components in the pump/bearing/seal system.

It is therefore an object of the invention to provide a mechanical seal and a manufacturing process for the mechanical seal so as to result in a mechanical seal which greatly resists if not eliminates the occurrence of such electro-corrosion.

To achieve these objectives, the invention generally relates to a mechanical seal having a pair of opposed seal rings which comprise a conventional combination of a silicon carbide seal ring and a carbon seal ring having opposing seal faces which define the sealing region therebetween.

In particular, the invention relates to the structure of such seal rings and the process for forming the seal rings which involves the application of a laser surface treatment which preferably is applied to the silicon carbide face so as to modify the surface properties thereof. By using a particular laser wavelength and energy density, it is possible to change the electrical conductivity of the silicon carbide face by the application of the laser to the entire seal face and thereby alter the surface properties of the silicon carbide from a normal insulative type condition to a condition where the silicon carbide seal face material acts as a conductor. The modified conductivity value of the seal face results from the seal face treatment and the conductivity value is set relative to the conductivity value of the opposing carbide seal face to relative values that results in a significant reduction or complete elimination of electro-corrosion.

Where micro-topography seal face features are provided in the seal ring, a laser machining process is known from published U.S. Patent Application No. 2003/0209859 A1 which is owned by the assignee of the present invention and incorporated herein in its entirety by reference. The laser machining process disclosed in this published application involves laser micro-machining of the seal face material at an energy level which results in ablation or removal of the seal face material to a selected depth and in a pattern which defines a desired pattern.

The aforementioned laser treatment process preferably is performed after the laser micromachining process at a lower energy level which avoids or substantially minimizes surface ablation. As such, the seal face maintains a flat, lapped surface condition in those areas outside the microtopography face features and maintains the desired shape of such face features. However, the energy level of the laser treatment process is set at a lower level which avoids or substantially eliminates ablation so that the treated seal face has the conductive properties thereof modified as desired to address the electro-corrosion problem.

Other objects and purposes of the invention, and variations thereof, will be apparent upon reading the following specification and inspecting the accompanying drawings.

Figure 1:
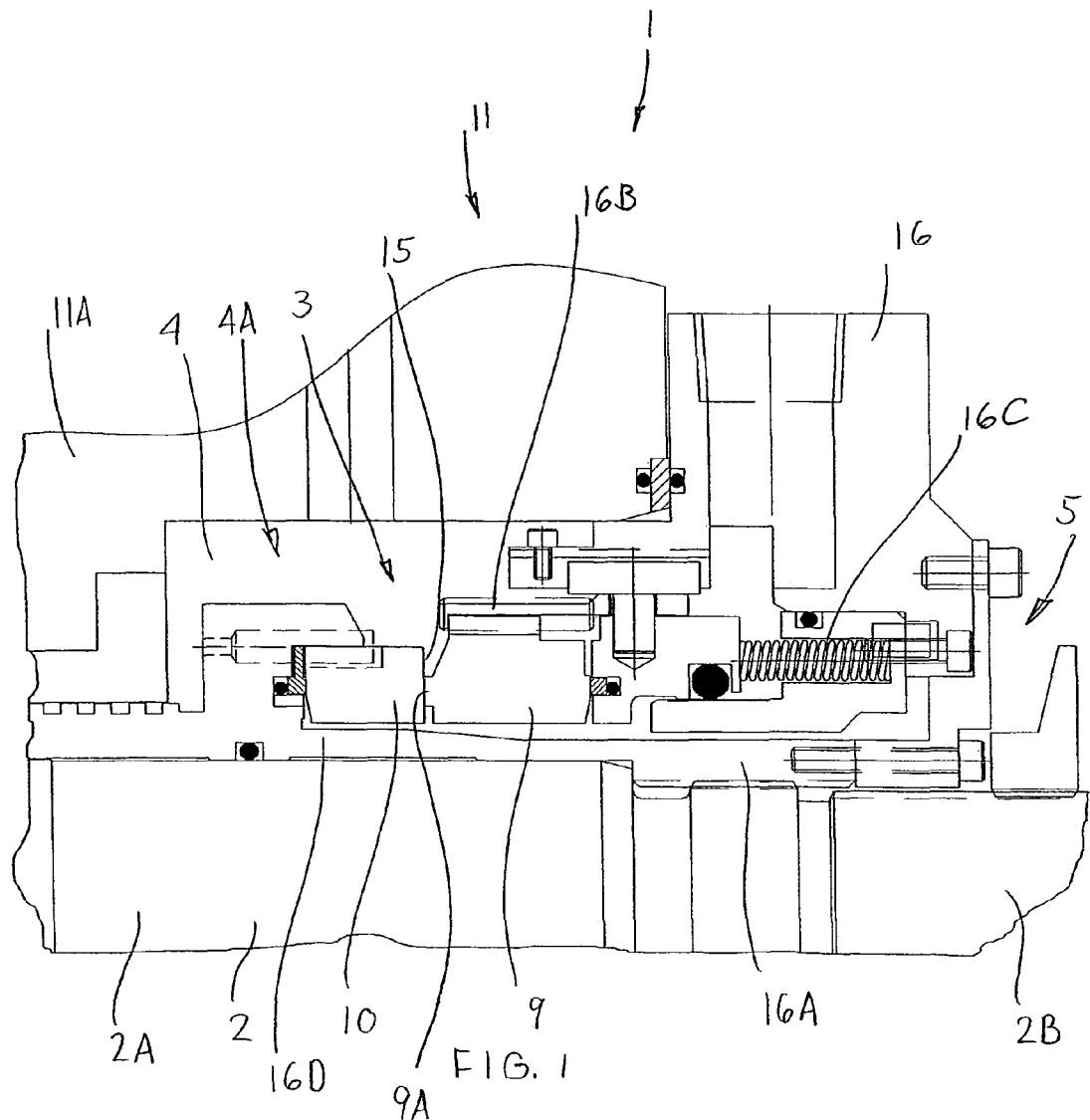
FIG. 1 is a side cross-sectional view of a mechanical seal incorporating a pair of seal rings made according to the process of the invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Figure 2:
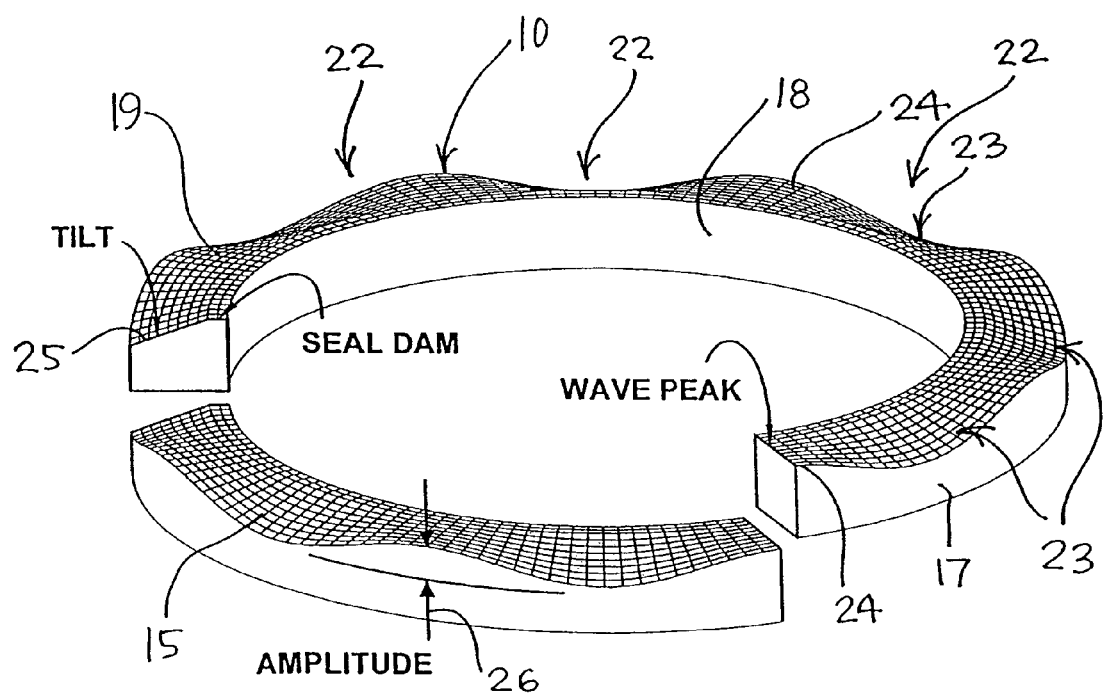
FIG. 2 is an exploded perspective view of one seal ring having a wavy faced micro-topography feature.
Figure 3:
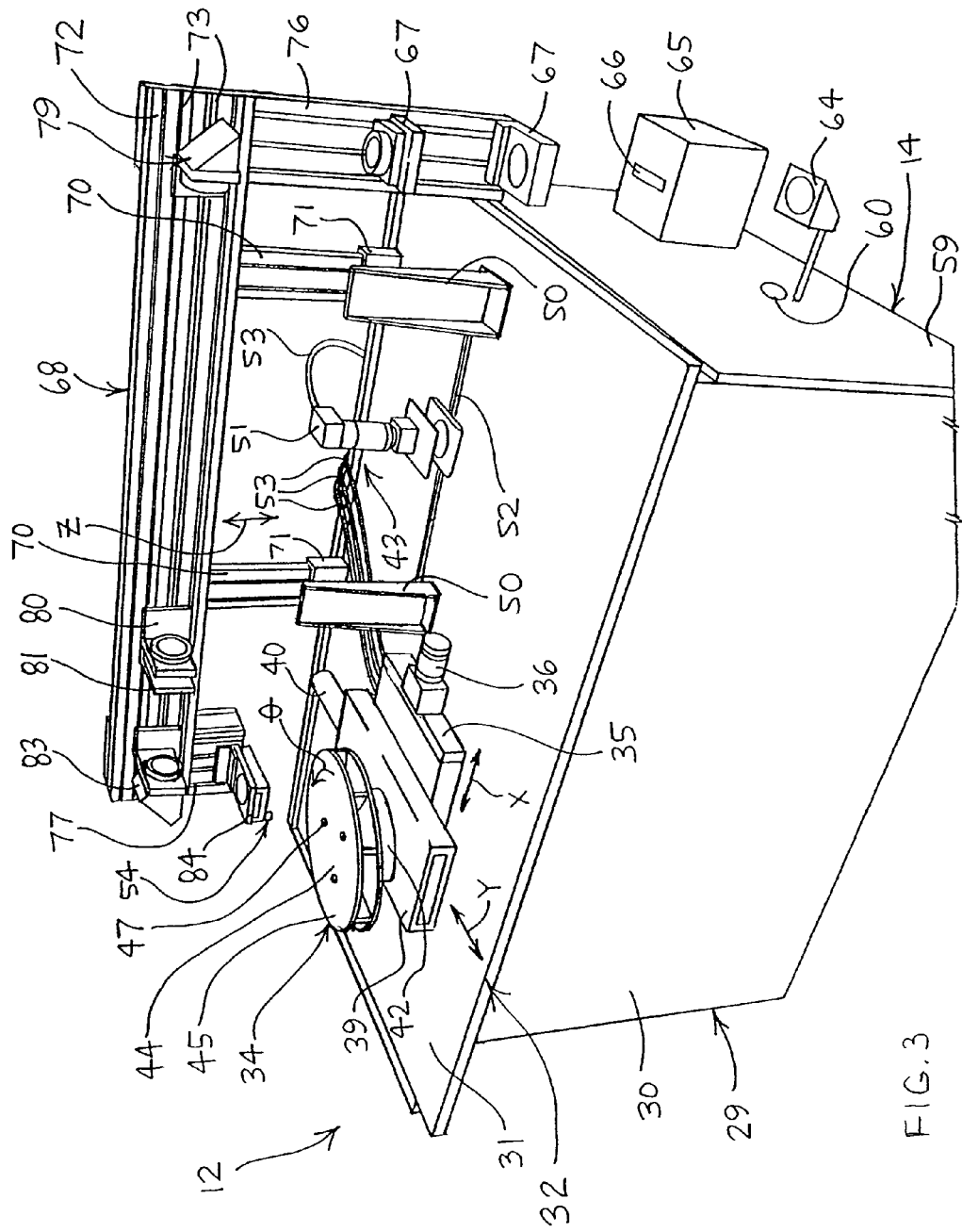
FIG. 3 is a perspective view of a seal ring manufacturing machine which includes an excimer laser and a support table which supports a seal ring thereon for forming the micro-topography features in the seal face by the laser and/or using the laser to treat the seal face to vary the material surface properties of a seal ring.

Referring to FIGS. 1, 2 and 3, the invention relates to a mechanical seal 1 which mounts to a rotatable equipment shaft 2, and specifically to the seal ring arrangement 3 thereof and the process for forming the seal ring arrangement 3 by which the material surface properties are modified to minimize electro-corrosion thereof.

Generally, the seal ring arrangement 3 sealingly separates a process fluid chamber 4 from the external seal environment 5 in a conventional manner. The seal ring arrangement generally includes a pair of opposed seal rings 9 and 10 (FIG. 1) which define a shaft seal to prevent leakage along the shaft 2 of rotary equipment 11, and the invention relates to a seal face treatment process using seal ring machining equipment 12 (FIG. 3) which has a laser unit 14 that forms micro-topography depth features in the seal face 15 of the seal ring 10 and/or performs a material surface treatment process to selectively redefine the material seal face properties so as to virtually eliminate electro-corrosion in the seal rings 10. As discussed herein, the seal rings 9 and 10 preferably are provided in a conventional combination of a carbide seal ring material for one of the seal rings, preferably seal ring 9, and a silicon carbide material for the other seal ring, preferably seal ring 10. As such, the laser machining and the laser treatment processes are preferably applied to the silicon carbide material.

Referring more particularly to the seal construction of FIG. 1, the mechanical face seal 1 is illustrated mounted on the rotatable shaft 2 of rotary equipment 11 such as a pump. The mechanical seal 1 includes the pair of concentric seal rings 9 and 10 which operate as a rotor and a stator respectively and effectively prevent fluid leakage along the shaft 2.

The machine 11 as illustrated in FIG. 1 includes a housing 11A which defines a seal chamber or process fluid chamber 4 therein in which chamber 4 a fluid 4A being sealed is confined. In the embodiment of FIG. 1, the fluid 4A being sealed preferably is ultra pure water as found in a boiler feed seal in the power industry as described previously. Typically, such water has a low conductivity, and typically undergoes an oxygen treatment thereof. In this particular seal application, electro-corrosion often occurs in conventional seals which has been a continuing problem. The mechanical seal 1 as constructed according to the process of the invention has been found through testing to at least minimize the occurrence of the above-described electro-corrosion. It will be understood that while the invention is particularly suitable for a boiler feed seal application, such is one exemplary application and the seal 1 of the invention may be adapted to any seal application in which electro-corrosion is a problem.

Further as to FIG. 1, the shaft 2 has a conventional circular cross section defined by an outer circumferential shaft surface 2A. To prevent leakage of the fluid 4A from the seal chamber 4 along the shaft surface 2A, the mechanical seal 1 is mounted on the machine housing 11A and the shaft 2 and defines a seal radially therebetween to contain the fluid 4.

The mechanical seal 1 includes an annular seal housing or cartridge 16 which mounts to the exterior face of the machine 11 and has an interior cavity 16A which opens axially through the center area thereof. The shaft 2 extends axially out of the seal chamber 4 and through the interior seal cavity 16A whereby an exposed end section 2B of the shaft 2 projects outwardly for connection to a motor or other drive unit of the machine 11.

As to the seal rings 9 and 10, the seal ring 9 is non-rotatably supported on the seal housing 16 so as to remain stationary during shaft rotation, wherein the seal ring 9 is essentially concentric to the shaft 2. The seal ring 9 includes a seal face 9A which extends radially between its inner and outer diameters. Thus, the outside diameter is exposed to the process fluid 4A being sealed within the chamber 4 while the inside diameter is exposed to an exterior fluid.

The seal ring 9 is prevented from rotating relative to the seal housing 16 by drive pins 16B which engage the outermost circumferential surface of seal ring 9, and is biased axially toward the other seal ring 10 by a plurality of circumferentially spaced apart springs 16C which project axially.

The other seal ring 10 in turn is mounted to the shaft 2 by a shaft sleeve 16D which sleeve 16D is non-rotatably connected to the shaft 2 so as to rotate in unison with the shaft 12. During assembly, the sleeve 16D is slidably received on the periphery 2A of the shaft 2 and is secured in place, and the seal ring 10 is then slid onto the shaft sleeve 16D.

The seal ring 10 further includes the seal face 15 which faces axially toward the opposing seal face 9A of the seal ring 9. The seal face 15 extends radially between an outside diameter thereof and an inside diameter. As seen in FIG. 1, the seal ring 9 is non-rotatably supported in the seal housing 16 while the opposing seal ring 10 is rotatably supported on the shaft 2 so as to rotate in unison therewith. When the shaft 2 is not rotating, the opposing seal faces 15 and 9A are disposed in contacting relation due to the biasing force of the springs 16C to prevent migration of the liquid being sealed radially inwardly across the sealing region which extends radially across these seal faces 15 and 9A.

During shaft rotation, the resilient spring loading of the seal ring 9 permits the seal ring 9 to be displaced axially away from the seal face 15. Therefore, during this shaft rotation, the seal faces 15 and 9A separate slightly whereby a liquid film is defined therebetween In order to stop leakage of the fluid 4A across the seal faces 15 and 9A even when the fluid film is generated therebetween, the mechanical seal 1 is machined with a face pattern as illustrated in FIG. 2. In particular, FIG. 2 illustrates the seal face 15 as having micro-topography depth face features.

As to the following discussion of the seal rings 9, of FIG. 1, the following discussion primarily focuses on the silicon carbide seal ring 10. The seal ring 10 as seen in FIG. 1 is formed for use in a generally conventional manner in that the seal ring 10 has an annular shape defined by an outer diameter 17 and an inner diameter 18. The seal face 15 extends radially between the outer and inner diameters 17 and 18 and defines a sealing region 19 which extends radially therebetween. When the seal ring 10 is installed as part of a shaft seal on a rotating shaft of a pump, or other similar piece of equipment, the seal face 15 is adapted to face axially in facing relation with the opposing seal face 9A of the other seal ring 9.

The seal ring 10 is illustrated in FIG. 1 as having micro-topography depth features in the form of a wavy face. In particular, the seal face 15 has an annular seal dam 20 on the inner diameter 18 thereof which is adapted to contact an opposing seal face. The seal dam 20 defines an annular region which prevents fluid leakage radially across the sealing region 19 during non-rotation and start-up conditions. While the seal dam 20 is located on the inner diameter 18, the seal dam 20 may be positioned at other radial positions such as the outer diameter 17.

The seal face 15 further includes a plurality of circumferentially adjacent waves 22 wherein each wave 22 includes a valley 23 disposed circumferentially between a pair of wave peaks 24. In the illustrated seal ring 10 of FIG. 1, the cross-sectional shape of the seal ring 10 at each wave peak 24 is rectangular such that the seal ring 10 has a uniform thickness at this location. The thickness of the seal ring 10, however, decreases circumferentially away from the wave peaks 24 along the outer diameter 17 in a generally sinusoidal manner and radially away from the seal dam 20. As a result, each valley 23 has a tilt or declined surface 25 which extends radially outwardly away from the seal dam 20 whereby the difference in thickness between the wave peaks 24 and the valley 23 is defined as the amplitude 26 of the waves 22. As can be seen, each wave 22 has variable depth in two directions, namely radially and circumferentially.

This wavy face thereby defines a hydrodynamic seal which generates a fluid film between opposing seal faces 15 and a resultant hydrodynamic lift during shaft rotation and thereby reduces friction and minimizes or eliminates contact across the sealing region 19. The actual topography of the seal face 15 is further illustrated by a rectangular topographical graph which is shown on the seal face 15 for illustrative purposes.

The general principal of using a wavy face on a seal ring is known. In some known wavy face seals, such wavy faces are formed by: first applying a shrink band which compresses the outer diameter of a seal ring and distorts the seal ring; lapping the seal face flat; and then removing the shrink band to eliminate the distortion whereby the resultant seal face has a wavy shape. In another known process described in further detail hereinafter, the seal ring machining equipment 12 allows for the formation of a wavy face by the laser unit 14. This laser machining apparatus and process is disclosed in greater detail in the present Assignee's published U.S. Patent Application No. 2003/0209859 A1. The following discussion first addresses the laser machining process and then addresses the additional material surface treatment process which may be applied to the seal ring 10 either after the formation of the depth features by the laser machining process or even in the absence of the depth features. In such an instance, the surface treatment process may be applied to a flat, unmachined seal face that has been lapped flat, or to a seal face having depth features formed through other conventional face machining processes.

Furthermore, while much of the following discussion addresses the formation of wavy faced seal rings, the laser unit 14 also may be used to form other micro-topography depth features such as radial or spiral grooves, T-shaped grooves and other features, particularly those features which have a size that requires multiple passes of a laser. Further, similar to the wavy face seal, these other depth features may have a variable depth in one or more directions.

Referring to FIG. 3, the seal ring machining equipment 12 includes a worktable 29 comprising a base 30 and a horizontally enlarged tabletop 31 which is supported on the base 30. The tabletop 31 has a seal ring support assembly 32 which is adapted to support the seal ring 10 thereon.

The support assembly 32 provides four-axis adjustment for adjusting the position of the seal ring 10 during a cutting operation since the laser remains stationary during use. In this regard, a support table 34 is provided on which the seal ring 10 is supported wherein the support assembly 32 includes an x-axis slide unit 35 having a controller motor 36 for moving the support table 35 along the x-axis as generally illustrated in FIG. 2A.

Additionally, a y-axis slide unit 39 is provided which is supported on the x-axis slide unit 35 so as to be movable therewith along the x-axis. The y-axis slide unit 39 supports the support table 35 on the top surface thereof and is movably connected to a control motor 40 for selectively moving the support table 35 along the y-axis.

More particularly as to the support table 34, the support table 34 is rotatably supported on the upper surface of the y-axis slide unit 39 and is rotatably connected to a motorized rotary table 42. The motorized rotary table 42 is selectively rotated to adjust the angular position of the seal ring 10 supported thereon. A further Z-axis slide unit 43 is provided as will be described herein to provide the four-axis adjustability.

To support the seal ring 10, the support table 34 includes an upper surface 44 defined by a circular plate 45. The seal ring 10 is positioned on the plate 45 and then clamped in place by three stops 47 which project upwardly from the plate 45. Each stop 47 is defined by an upstanding rod-like projection 48 and a resilient o-ring 49 on the projection 48. The stops 47 are movable simultaneously together radially outwardly to provide enough clearance for positioning of the seal ring 15 therebetween, and radially inwardly for gripping the outside diameter 17 of the seal ring 10. Accordingly, the seal ring 10 is clamped onto the support table 34 and then the position of the seal ring 10 can be adjusted along the x-axis, y-axis and the angular position theta can also be adjusted. The support table 34 further provides for rotation of the seal ring 10 through multiple revolutions wherein the laser unit 14 cuts grooves circumferentially along the seal face 15 at a cutting radius, and then the x-axis and y-axis position of the seal ring 10 is adjusted to provide successive cuts at different cutting radiuses.

To provide adjustment in the vertical z-axis, the seal ring support assembly 32 further includes the z-axis slide unit 43 which comprises a pair of sidewardly spaced apart upright support posts 50 which are adapted to support components of the laser unit 14 thereon. The seal ring support assembly 32 also includes a drive motor 51 and a drive belt 52 extending horizontally between drive motor 51 and precision linear slides 71 mounted to the posts 50 for adjusting the vertical height of the laser unit components.

All of the motors of the seal ring support assembly 32 are connected to a computer control unit by appropriate control cables 53. The control unit is programmable so that the various motors 36, 40 and 51 as well as the rotary table motor which rotates the support table 34 are selectively operated to control the position of the seal ring 10 for laser machining of the seal face 15. The control unit is run using the computer program Labview which is commercially available.

Figure 5:
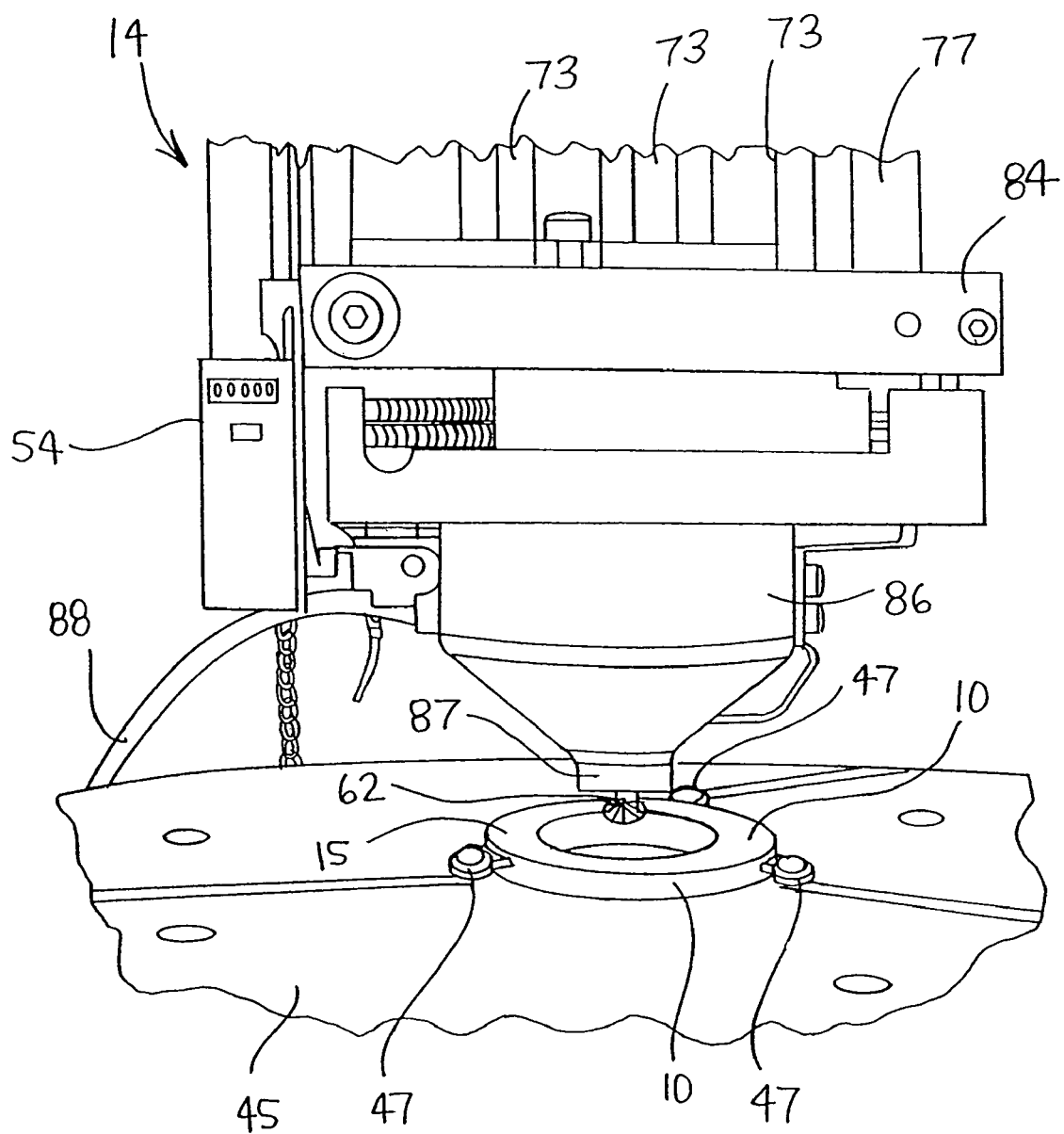
FIG. 5 is a front perspective view of the seal ring on the support table during the laser machining process and/or being subject to the material surface treatment process.

A displacement laser 54 (FIGS. 3 and 5) also is provided which is directed toward the seal ring 10 and is connected to the control unit to identify the initial position of the seal ring 10 relative to the final objective lens 84 of the laser and permit precise control of the position of the seal ring 10. During the start of the laser cutting process, the seal ring 10 is moved below the displacement laser 54 and the z-axis position is adjusted so that the proper focal length for the laser is provided.

Depending upon the programming of the control unit, the laser unit 14 not only is used to define a wavy face on the seal ring 10 but also may be used to define other micro-topography features such as spiral grooves and the like.

Turning to the laser unit 14 as illustrated in FIG. 3, an excimer laser 59 is provided within the base 30 and includes a laser beam exit port 60 which opens sidewardly therefrom. The excimer laser 59 is a krypton fluoride (KrF) laser which operates in the ultraviolet wavelength region of about 248 nanometers. This laser is selected since little if any heat is produced in the seal ring 10 when forming the micro-topography features.

Generally, the laser 59 generates a laser beam 62 (FIG. 4) which contacts the seal face 15 and removes material therefrom by ablation. To direct the laser beam 62 from the exit port 60 on the side of the base 30 to the seal ring 10 provided on the top of the tabletop 31, a series of lenses and mirrors are provided.

More specifically, the laser beam 62 exits sidewardly and strikes a turning mirror 64 which is supported on a side of the base 30 to redirect the beam upwardly to an attenuator 65 that is mounted to a side of the base 30. The beam 62 then exits upwardly from an attenuator port 66 to a vertically spaced apart pair of homogenizer lenses 67 that are supported on a support rail arrangement 68.

As to the support rail arrangement 68, this arrangement includes a pair of upright rails 70 wherein the lower ends of the rails 70 are slidably connected to the posts 50 by the linear slides or vertical actuators 71. The actuators 71 connect the rails 70 and posts 50 together whereby the above-described drive motor 51 is selectively operated to displace the entire support rail arrangement 68 vertically along the z-axis.

The upper ends of the rails 70 support a horizontal optics rail 72 wherein the optics rails 72 includes a plurality of horizontal slots 73 for slidably supporting optical components thereon. The rearward end of the optics rail 72 has a downwardly depending support rail 76 on which the homogenizer lenses 67 are slidably supported. The lenses 67 may be adjusted vertically for adjusting the characteristics of the laser beam 62. Additionally, the opposite end of the optics rail 72 further includes another downwardly depending support rail 77.

With respect to the optics rail 72, a first turning mirror 79 is provided directly above the homogenizer lenses 67 to receive the beam therefrom and redirect the beam sidewardly along the length of the optics rail 72. Proximate the other end of the optics rail 72, a field lens 80 is slidably supported on the rail slots 73 which lens 80 further includes a generally rectangular mask 81 adjacent thereto on the downstream side of the field lens 80. The mask 81 serves to shape the laser beam prior to application of the laser beam 62 to the seal ring 10.

Figure 4:
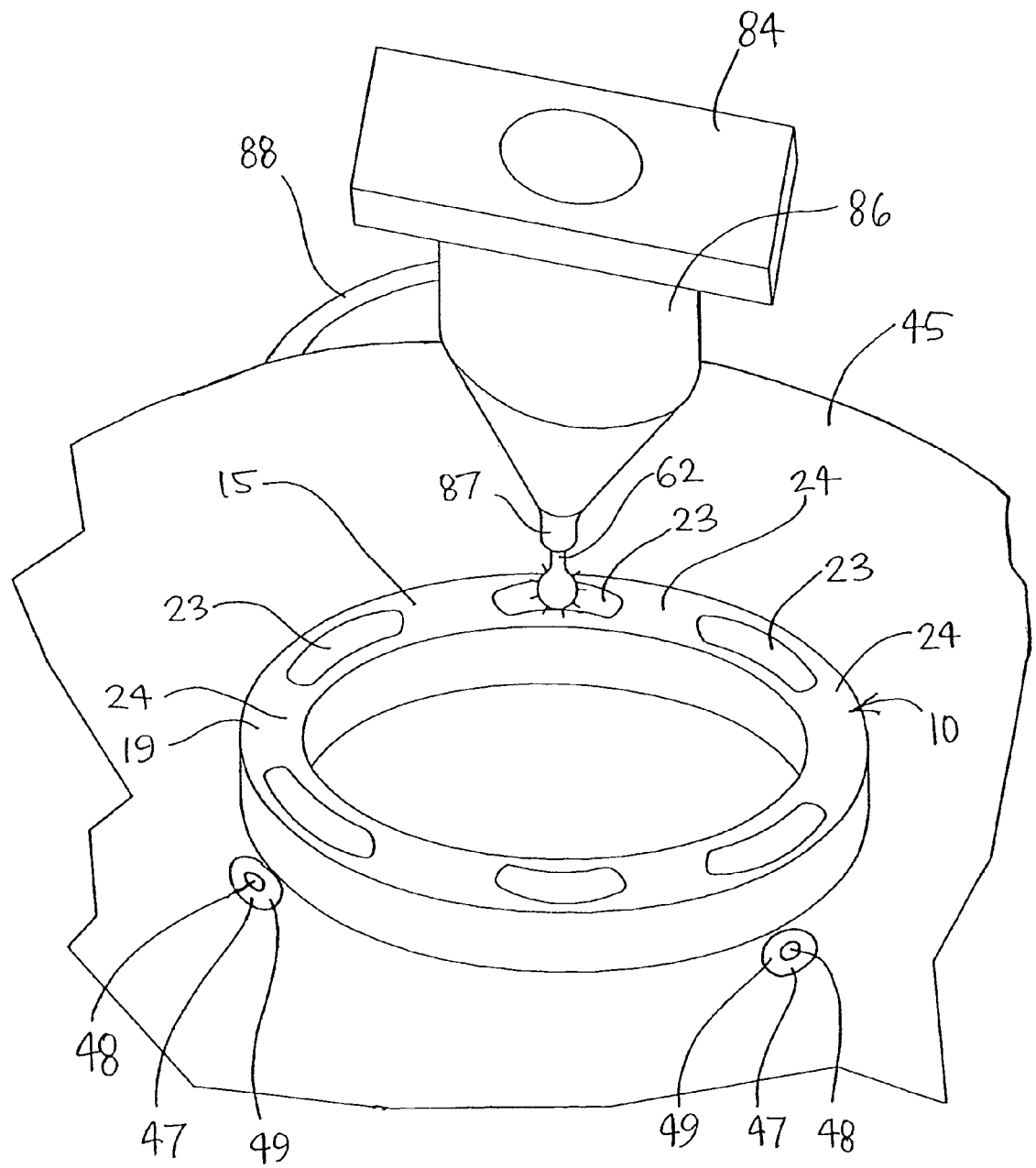
FIG. 4 is an enlarged side perspective view of a seal ring being formed with micro-topography seal face features.

The shaped laser beam 62 thereby travels horizontally downstream from the field lens 80 and is redirected downwardly by another turning mirror 83. Lastly, the shaped laser beam 62 passes through a final objective lens 84 and then projects downwardly onto the seal face 15 as generally illustrated in FIG. 4.

To prevent contamination of the final objective lens 84 particularly in view of the proximity of the final objective lens 84 to the rotary support table 34, the final objective lens 84 also includes a funnel-like shroud 86 (FIGS. 4 and 5) having a downward opening exit port 87. An air feed 88 is connected to the shroud 86 and provides an air flow into the shroud 86 which air flow blows downwardly through the exit port 87 so that any debris from the laser process is blown away from the objective lens 84.

During operation, the laser is selectively turned on, i.e. fired or pulsed, to cut and vaporize seal ring material as the laser beam 62 is applied to an exposed area of the seal ring 10. By selectively turning the laser on and off, circumferentially spaced apart cuts may be made to the seal ring.

In the illustrated embodiment, the seal ring support assembly 32 not only positions the seal ring 10 relative to the laser beam 62, the seal ring support assembly 32 also effects rotation of the seal ring 10 by the rotary table 34 relative to the laser beam 62. This thereby creates circumferential cutting of the seal face 15 during pulsing of the laser beam 62, although it also should be understood that it is possible to shift the seal ring 10 in the x-axis and y-axis directions to effect linear displacement of the seal ring 10 if desired rather than just rotatable displacement thereof. Further, it will be understood that relative movement between the laser beam 62 and seal ring 10 may be provided with a movable laser beam 62 wherein the seal ring 10 instead is kept stationary or even simultaneous movement of both the laser beam 62 and seal ring 10.

With respect to the mask 81, this mask serves to shape the laser beam 62 to a desired cross-sectional shape which optimizes cutting of the seal ring 10. For example, as the mask 81 is a rectangular thin plate preferably formed of a stainless-steel material although a thin sheet of other suitable material may be used.

In addition to this laser machining process and apparatus, the present invention further incorporates the discovery that the seal ring surface properties can be altered by the use of various laser wavelengths and energy densities at levels that are not sufficient to effect ablation, but still selectively modify or alter the material surface properties. Specifically, it is possible to change the electrical conductivity of the silicon carbide with the use of the laser beam 62. It has been found that the above-described electro-corrosion problem may be overcome by selectively altering the surface properties of the seal rings, and preferably seal ring 10 so as to have a conductivity level which is made closer to the conductivity level of the carbon seal ring 9.

Normally silicon carbide is an insulator, but the use of laser processing of the seal face 15 with either the 248 nm Excimer laser 54, described above, or a 1064 nm YAG (Nd:yttrium-aluminum-garnet) laser can alter the surface properties of the seal face 15 so that at the surface the material is altered to act as a conductor. This laser processing of the seal face 15 thereby generates a shallow layer of seal face material having conductive properties which differ from the normal conductive properties originally found in the silicon carbide material. The depth of this electrically conducting layer is on the order of one micron deep and then decreases rapidly beyond this point so that the majority of the seal ring 15 still exhibits the original level of conductivity through most of the axial thickness thereof.

It has been found that these results can be obtained within a wide range of laser operating conditions. Normally, the laser micromachining described above for material removal, i.e. ablation, requires that a certain fluence (energy density) level be reached for ablation to occur. In the case of SiC, that fluence level is on the order of 2 $J/cm^2$ for the laser machining process described above. One must be at or above this threshold for efficient removal of material to occur to thereby form the micro-topography depth features in the areas being machined. It has been found that the effects mentioned afore are present in the machined areas at fluences much greater than the 2 $J/cm^2$. This type of material removal process is normally accompanied by the use of an air flush from port 87 in the area of the laser beam contact with the SiC surface as seen in FIG. 4. However, in the non-machined areas which have not been laser machined, such areas retain their original material properties.

The use of such high fluence levels may be appropriate for material removal but it has found that much lower energy levels provide the same results as to altering the material surface properties without removing material. Successful surface modification of the seal face surface properties has been accomplished using fluence levels as low as 1 $J/cm^2$. As such, the laser treatment process is a second process which may be applied to the entire seal face 15 so as to not alter the desire contour of the seal face 15 while still altering the surface properties across the entire seal face area to which the seal face laser treatment is applied.

This second method therefore is advantageous because in many cases it may not be desirable to remove material. In this regard, it is a common practice to lap seal faces flat for general services. Once a face has been lapped flat, such as before the laser machining process, one would not want to alter that flat condition. Therefore, by utilizing a lower energy level for laser surface treatment processing it is possible to alter the surface characteristics of the seal face 15 without changing its form or contour. Hence, the seal ring may be formed by being lapped flat or provided in a lapped condition, laser machined with appropriate micro-topography depth features, and then surface treated to alter the conductivity thereof.

For the laser treatment process, the typical frequency of the laser pulse used is 190 Hz with a beam speed of approximately 43 mm/sec as generated by rotation of the support table 44. One could increase the beam speed up to as much as twice this at the same pulse frequency and achieve similar results but with the downside of greater surface roughness. It could also be said that one could significantly increase the frequency of the laser pulse and also proportionally increase the beam speed to produce this affect in a shorter process time.

To fully treat a seal face, the laser beam 62 preferably is provided about a single circumferential path for one revolution of the seal ring 15. Then the laser beam 62 would be incremented radially to travel about a next successive path contiguous with the prior beam path. Preferably, the beam paths are incremented radially outwardly so that the seal face 15 is surface treated starting at the inside diameter (ID) and ending at the outside diameter (OD). Preferably, the beam 62 is shaped so as to have a circumferential length of about 0.033 inches and a radial width of about 0.044 inches. In that the fluence levels are sufficiently low so as to substantially eliminate ablation of the seal face material, there is no problem with overlapping of the contiguous beam paths during the surface treatment process. Preferably, the beam 62 is also shaped so as to be generally rectangular with radiused or rounded corners. It has been found that with the carbon measured at 0.5 ohms and the silicon carbide in a range of 5,000 to 40,000 ohms, the resistance ratio of the lasered surface to carbon is between 1e4 and 8e4.

This laser treatment process may be applied to a uniformly flat seal face having no hydrodynamic lift features formed therein. Where such features are provided, such as by the laser machining process described above or other known methods, the surface treatment process can be performed on both the flat lapped portions and the contoured machined portions and the surface properties would be altered in both areas without changing the desired surface shapes or contours that have already been defined.

Tests have been run using a laser treated SiC face running against carbon and it has been found that no significant damage to the carbon or silicon carbide seal rings has occurred.

While each beam pass would occur over one revolution, it has been noted that a visual line may be seen extending radially across the seal face where each contiguous beam pass starts and stops at the same circumferential location. This is believed to be an aesthetic phenomenon. To eliminate this occurrence, each beam pass is preferably set to randomly start and stop so that a revolution randomly varies from 360 degrees to 370 degrees, and incrementally shifting the beam from the stop location to the next radially contiguous start location. By randomly varying the start and stop points between this range of 360-370 degrees, the aforementioned line has been eliminated.

As to the flush provided to the beam 62, it also has been found that altering of the surface conductivity can be produced in the presence of a helium flush where little or no oxygen is present.

In addition to helium, flush gases may also include air, nitrogen, argon, hydrogen and chlorine. As discussed below, test results with the nitrogen indicate improved results relative to use of air as the flush gas.

Additionally, improvements have been identified relative to the location of the focal point of the beam 62. The "ideal" focal point means that the beam is focused to an end point or area where the beam is the smallest and has the highest energy density. For the above-described laser machining process, the ideal focal point has been set at the surface so as to maximize ablation of the ring material. During this process, the above-described flush gas is injected along the beam path at the funnel 86 through the exit port 87. This gas surrounds the beam down to the surface being lasered and machined and/or treated.

As to the ideal focal point, the ablation area has maximum ablation when the ideal focal point is focused to the surface being machined. Relative to this ideal focal point, the beam area becomes larger in size both above the ideal focal point in the positive direction, or below the focal point which is the negative direction towards or within the ring material. Further testing has been conducted relative to the focusing of the beam wherein the ideal focal point may be located on the negative side which would be that location located to a desired depth within the seal ring material away from the surface, or in the positive direction wherein the ideal focal point is located above the seal ring face. Testing has identified two improvements resulting from the defocusing of the beam particularly to the negative side of the ring surface. These two improvements relate to: 1) an improved surface finish or smoothness; and 2) a further decrease in electrical resistance. As discussed below, the second improvement has the greatest importance when it comes to the electrocorrosion problem discussed above in that it further assists in trying to match the resistance level of both seal ring faces.

Figure 6:
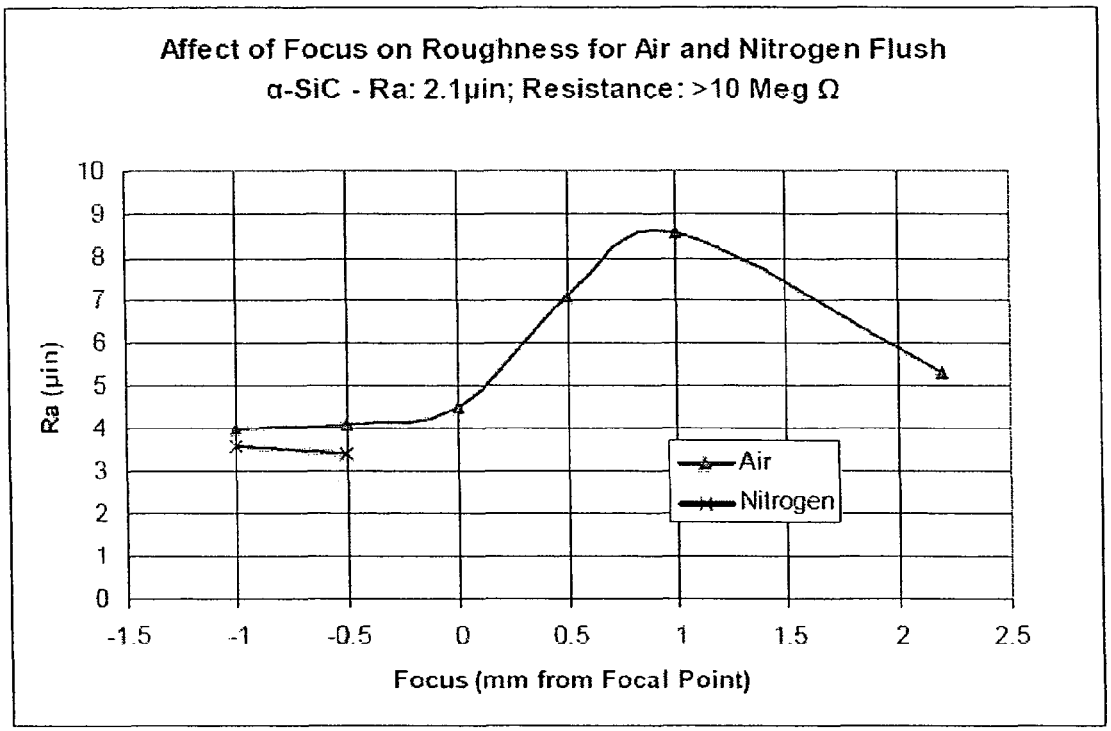
FIG. 6 is a graph illustrating the effect of changes in a focal point location of a laser beam relative to the surface smoothness resulting therefrom.

Turning to the first improvement, FIG. 6 provides a graph of the test results showing a graph of the test results where the flush gas is air in one set of tests and then nitrogen in a second set of tests. The testing was accomplished with respect to the machined surface finish having a smoothness of Ra of 2.1 μin. While different surface smoothness levels may be selected based upon the machine finishing process applied to the ring face, testing was accomplished with a surface smoothness of 2.1 μin. This is achieved by a finishing process where the seal face is lapped or the like by other like process to achieve the desired smoothness prior to the laser machining process and/or the laser surface treatment. Thereafter, laser machining was performed on the ring face pursuant to the above-described process wherein the laser machining process may negatively impact the surface smoothness and increase the Ra amount.

The graph of FIG. 6 also shows data points for the focus, with the focal point location being either on the positive side located at indicated distances above the ring face or on the negative side which would indicate that the focal point is located below the ring surface or at a particular depth within the material. Machining does not occur to this focal point depth, but operating the laser with this focal point depth results in an increase in the beam area acting on the seal face being treated. FIG. 6 illustrates how defocusing of the focal point to a negative 0.5 mm reduces the surface smoothness Ra to about 4 μin. When the focal point is at −0.5 mm, the surface smoothness is further improved when nitrogen is used as the flush gas. A definite difference is noted when the focal point is on the positive side, with the least improvement in surface smoothness occurring at 1 mm for the focal point.

It is believed that the improvements in surface smoothness appear to result from limited melting of the seal ring material which occurs during the surface treatment process which, as discussed above, occurs at an energy level that is low enough so that ablation does not occur. While ablation does not occur, it is believed that some surface melting does occur to provide some improved surface finishing and smoothness to the seal ring face.

Figure 7:
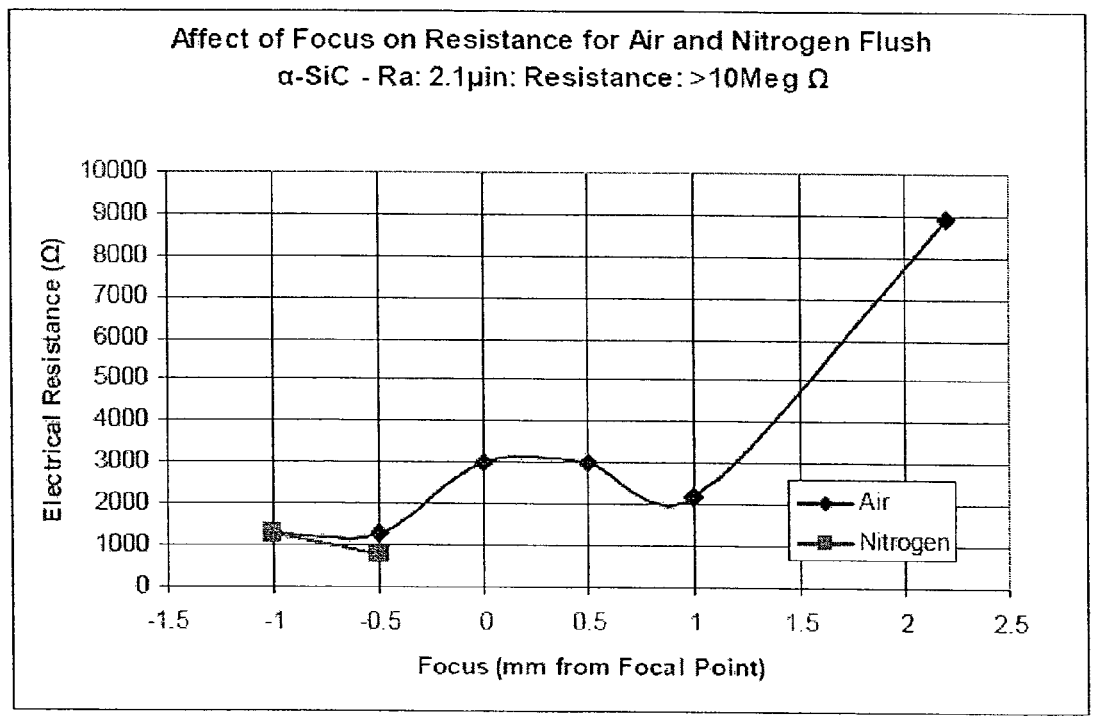
FIG. 7 is a graph illustrating the effect of changes in the focal point location relative to the electrical resistance exhibited by the surface being treated.

As to the second improvement identified by testing, FIG. 7 illustrates the impact of the changes in the focal point depth, i.e. positive or negative, relative to the electrical resistance obtained in the seal face material. The laser treatment of the surface results in a silicon carbide material being modified from a non-conductive material, which essentially has an infinite resistance, to a semi-conductor having an electrical resistance which is substantially decreased and reduced proximate to 1,000 ohms. Here again, the optimum focal point depth appears to be at −0.5 mm with a nitrogen flush gas providing improved characteristics when compared with air as the flush gas.

This second improvement is of greatest importance relative to the elecrocorrosion problem in that the resistance level can be decreased to a level which is closer to the mating face material which in many cases would be carbon that has an electrical resistance of only several ohms. By further modifying the focal point as part of the laser treatment process, this modified process allows the resistance of the SiC material down to about 1,000 ohms if a nitrogen flush gas is used. Further improvements may also be achievable depending upon the use of other flush gases in combination with selection of an appropriate focal point.

Additionally, relative to the laser machining process, adjustment of the ideal focal point location also has resulted in improved surface characteristics on the machined surface prior to the laser treatment process being applied to the seal face to adjust the electrical resistance. Typically, the ideal focal point in the laser machining process was set to be located at the seal face surface. High magnification photographs of the surface after such laser treatment exhibited what appeared to be submicron cracks along with some melt effect which appeared to smooth the surface. When the focal point is adjusted during further testing, for example, to 0.5 mm, the melt effect appears to be present, but it does not appear that this has resulted in crack propagation or the existence of cracks therein. Hence, adjusting the ideal focal point also improves the laser machining process.

Although particular embodiments of the invention have been disclosed in detail for illustrative purposes, it will be recognized that variations or modifications of the disclosed apparatus, including the rearrangement of parts, lie within the scope of the present invention.

What is claimed is:

1. A method for forming a corrosion resistant seal ring for a mechanical seal having first and second seal rings wherein one said seal ring is configured for mounting to a rotating shaft so as to rotate with said shaft about a shaft axis and the other said seal ring is configured for stationary mounting to a seal housing so as to remain stationary during rotation of said shaft-mounted seal ring, said first and second seal rings having respective end faces that define opposed seal faces which face axially toward each other in close opposing relation and rotate relative to each other during shaft rotation to define a sealing region which extends radially across said end faces and sealingly separates a process fluid chamber from a seal chamber disposed adjacent said seal rings, said first and second seal rings respectively being formed of different first and second seal ring materials which have respective first and second electrical conductivity levels which differ from each other, the method comprising the steps of:

providing a seal ring having inner and outer diameters extending about a seal ring axis, said seal ring being formed of said first seal ring material so as to have an original conductivity level which is defined by original conductive properties of said first seal ring material such that said original conductivity level defines said first conductivity level, said first seal ring having said seal face disposed between said inner and outer diameters and exhibiting seal face properties wherein said original conductivity level extends across said seal face;

treating said seal face of said first seal ring by a laser treatment process to modify the seal face properties of said first seal ring such that said original conductivity level is changed to a modified conductivity level over said seal face, said modified conductivity level being set proximate to said second conductivity level of said second seal ring to thereby minimize electro-corrosion between said seal faces of said first and second seal rings in mechanical seal applications prone to electro-corrosion; and said laser treatment process being applied to said seal face of said first seal ring such that said first seal ring has said modified conductivity level in a layer at said seal face and has said original conductivity level extending through the remaining axial thickness of said first seal ring, wherein said laser treatment process comprises the step of applying a laser beam over said seal face between said inner and outer diameters at a treatment energy level which substantially avoids ablation of said first seal ring material while changing said original conductivity level to said modified conductivity level.

2. The method according to claim 1, wherein said original conductivity level is electrically insulative and said modified conductivity level is electrically conductive.

3. The method according to claim 2, wherein said treatment energy level is at a treatment fluence level lower than a fluence threshold for material ablation to occur.

4. The method according to claim 3, which further includes the step of applying a surface finishing process to said seal face of said first seal ring prior to said treating step to define a finished surface contour of said seal face.

5. The method according to claim 4, wherein said finished surface contour has micro-topography seal face features formed in portions of said seal face while the remainder of said seal face is formed flat.

6. The method according to claim 5, wherein said surface finishing process comprises the step of selectively applying a laser beam to said seal face to form said micro-topography seal face features, said laser beam being applied to said seal face at an ablative energy level higher than a fluence threshold necessary for material ablation to occur so as to ablate said first seal ring material over said portions of said seal face to form said micro-topography seal face features.

7. The method according to claim 6, wherein said laser treatment process comprises the step of applying said laser beam over said seal face between said inner and outer diameters, wherein said treatment energy level is lower than said ablative energy level to substantially avoid ablation of said first seal ring material while changing said original conductivity level to said modified conductivity level.

8. The method according to claim 7, wherein said original conductivity level is electrically insulative and said modified conductivity level is electrically conductive.

9. The method according to claim 8, wherein said treatment energy level is at a treatment fluence level lower than said fluence threshold for material ablation to occur.

10. The method according to claim 4, wherein said finished surface contour is flat.

11. The method according to claim 10, wherein said surface finishing process comprises the step of lapping said seal face substantially flat.

* * * * *